(12) United States Patent
Propheter-Hinckley

(10) Patent No.: US 10,428,658 B2
(45) Date of Patent: Oct. 1, 2019

(54) AIRFOIL WITH PANEL FASTENED TO CORE STRUCTURE

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 355 days.

(21) Appl. No.: 15/354,088

(22) Filed: Nov. 17, 2016

(65) Prior Publication Data

US 2018/0135421 A1 May 17, 2018

(51) Int. Cl.
| | |
|---|---|
| F01D 5/14 | (2006.01) |
| F01D 5/28 | (2006.01) |
| F01D 9/04 | (2006.01) |
| F02C 3/04 | (2006.01) |
| F04D 29/02 | (2006.01) |
| F04D 29/38 | (2006.01) |
| F04D 29/54 | (2006.01) |

(52) U.S. Cl.
CPC .......... *F01D 5/147* (2013.01); *F01D 5/282* (2013.01); *F01D 5/284* (2013.01); *F01D 9/041* (2013.01); *F02C 3/04* (2013.01); *F04D 29/023* (2013.01); *F04D 29/388* (2013.01); *F04D 29/541* (2013.01); *F05D 2220/32* (2013.01); *F05D 2240/12* (2013.01); *F05D 2240/30* (2013.01); *F05D 2300/10* (2013.01); *F05D 2300/20* (2013.01); *F05D 2300/6033* (2013.01); *F05D 2300/611* (2013.01); *Y02T 50/672* (2013.01)

(58) Field of Classification Search
CPC combination set(s) only.
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |
| 4,247,259 A | 1/1981 | Saboe et al. |
| 4,396,349 A | 8/1983 | Hueber |
| 4,914,794 A | 4/1990 | Strangman |
| 5,358,379 A | 10/1994 | Pepperman et al. |
| 5,538,380 A | 7/1996 | Norton et al. |

(Continued)

FOREIGN PATENT DOCUMENTS

| | | |
|---|---|---|
| EP | 0764764 | 3/1997 |
| EP | 1764481 | 3/2007 |

(Continued)

OTHER PUBLICATIONS

U.S. Appl. No. 13/429,474, filed Mar. 26, 2012.

(Continued)

*Primary Examiner* — Igor Kershteyn
(74) *Attorney, Agent, or Firm* — Carlson, Gaskey & Olds, P.C.

(57) ABSTRACT

An airfoil includes a core structure and a panel fastened to the core structure. The panel has an exterior, gas path side and an opposed interior side that includes a tab. The core structure includes a hole. The tab of the panel is locked with the hole such that the core structure supports the panel.

11 Claims, 4 Drawing Sheets

(56) References Cited

U.S. PATENT DOCUMENTS

| | | | |
|---|---|---|---|
| 5,616,001 A * | 4/1997 | Boyd | F01D 5/284 415/209.2 |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,648,597 B1 * | 11/2003 | Widrig | C04B 37/001 415/200 |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 * | 11/2008 | Vance | F01D 5/14 415/135 |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,167,573 B2 * | 5/2012 | Merrill | F01D 5/288 416/224 |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,475,132 B2 * | 7/2013 | Zhang | F01D 5/147 416/225 |
| 8,480,366 B2 | 7/2013 | Malecki et al. | |
| 8,506,243 B2 | 8/2013 | Strock et al. | |
| 8,821,124 B2 | 9/2014 | Viens et al. | |
| 2008/0159850 A1 | 7/2008 | Tholen et al. | |
| 2009/0025365 A1 * | 1/2009 | Schilling | B64C 11/205 60/39.34 |
| 2010/0136258 A1 | 6/2010 | Strock et al. | |
| 2015/0218954 A1 * | 8/2015 | Witz | F01D 5/282 416/213 R |
| 2015/0354377 A1 * | 12/2015 | Gimat | B29B 11/16 415/200 |
| 2016/0090851 A1 | 3/2016 | Carr et al. | |
| 2017/0274485 A1 * | 9/2017 | Queant | B23P 6/00 |

FOREIGN PATENT DOCUMENTS

| | | |
|---|---|---|
| EP | 2022942 | 2/2009 |
| EP | 2105579 | 9/2009 |
| EP | 2853688 | 4/2015 |
| EP | 2902588 | 8/2015 |
| GB | 2272453 | 5/1994 |
| JP | 61066802 | 4/1986 |
| JP | 05321602 | 12/1993 |
| WO | 2016030614 | 3/2016 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202228.7 completed May 7, 2018.

* cited by examiner

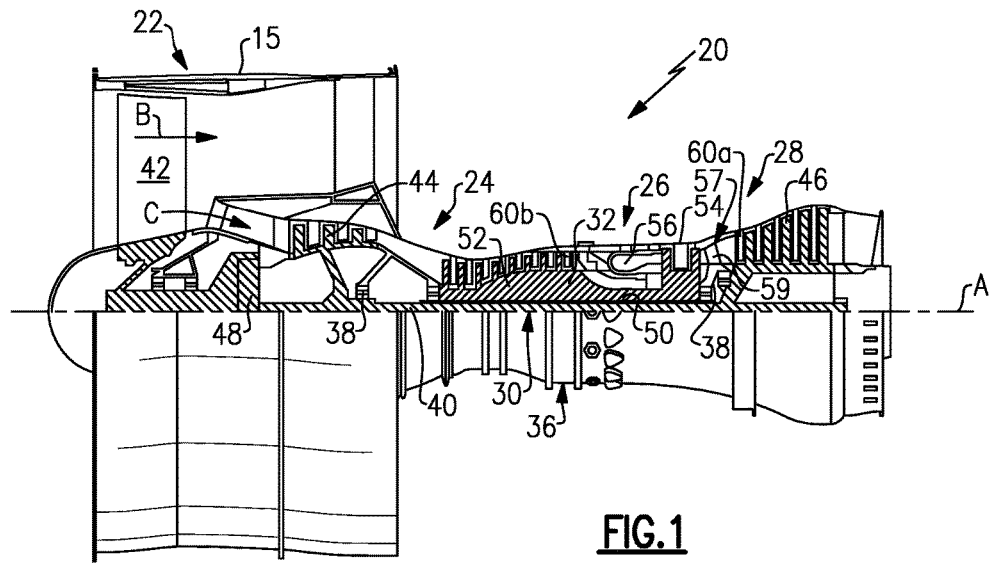
FIG.1
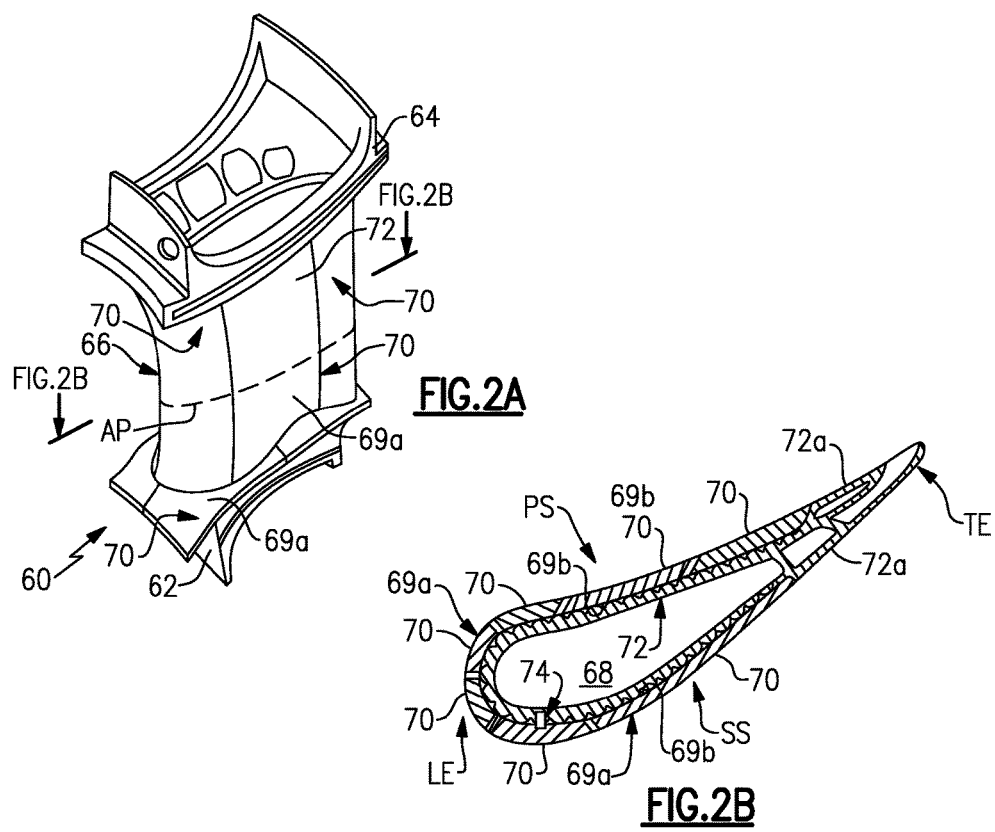
FIG.2A
FIG.2B

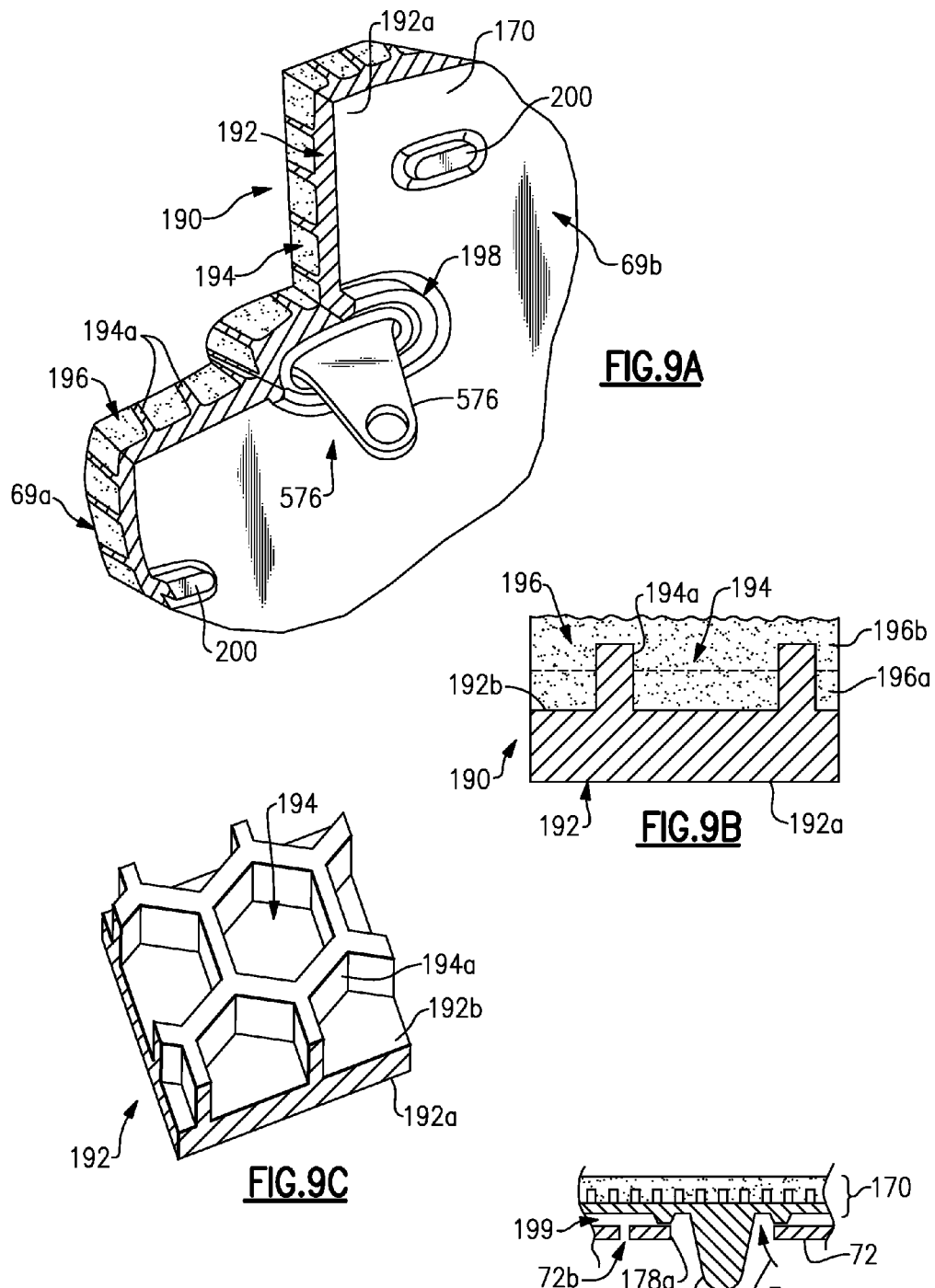

AIRFOIL WITH PANEL FASTENED TO CORE STRUCTURE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes a core structure that has a first fastener comprising a hole. A panel is fastened to the core structure. The panel has an exterior, gas path side and an opposed interior side. The interior side includes a second fastener comprising a tab locked with the hole such that the core structure supports the panel.

In a further embodiment of any of the foregoing embodiments, the tab includes a retainer locking the tab with the hole.

In a further embodiment of any of the foregoing embodiments, the retainer is a cotter pin.

In a further embodiment of any of the foregoing embodiments, the retainer includes a spring biasing the panel against the core structure.

In a further embodiment of any of the foregoing embodiments, the tab is deformed such that the tab locks with the hole.

In a further embodiment of any of the foregoing embodiments, the panel is formed of a laminated ceramic matrix composite having layers. The first fastener includes a base from which the tab projects, and the base is disposed between the layers.

In a further embodiment of any of the foregoing embodiments, the layers define a cavity, and the base is free-floating in the cavity.

In a further embodiment of any of the foregoing embodiments, the base and the tab are formed from at least one of a metal or a ceramic.

In a further embodiment of any of the foregoing embodiments, the panel includes a metal wall, and the tab projects from the metal wall.

A further embodiment of any of the foregoing embodiment includes a seal member sealing the hole.

In a further embodiment of any of the foregoing embodiments, the panel includes a geometrically segmented coating section. The geometrically segmented coating section includes a wall that has the exterior side. The exterior side includes an array of cells, and a coating disposed in the array of cells.

In a further embodiment of any of the foregoing embodiments, the panel is ceramic and the core structure is metal.

In a further embodiment of any of the foregoing embodiments, the panel is in an airfoil section that defines an airfoil profile, and the panel forms a portion of the airfoil profile.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil section defining an airfoil profile. The airfoil section include a core structure that has a first fastener comprising a hole. A panel is fastened to the core structure. The panel has an exterior, gas path side and an opposed interior side. The interior side includes a second fastener comprising a tab locked with the hole such that the core structure supports the panel.

In a further embodiment of any of the foregoing embodiments, the tab includes a retainer locking the tab with the hole.

In a further embodiment of any of the foregoing embodiments, the panel is formed of a laminated ceramic matrix composite having layers. The first fastener includes a base from which the tab projects, and the base is between the layers.

In a further embodiment of any of the foregoing embodiments, the panel is ceramic and the core structure is metal.

An airfoil according to an example of the present disclosure includes an airfoil section that defines an airfoil profile. The airfoil section includes a core structure, and a panel fastened to the core structure. The panel forms a portion of the airfoil profile.

In a further embodiment of any of the foregoing embodiments, the panel includes a first fastener and the core structure includes a second fastener locked with the first fastener.

In a further embodiment of any of the foregoing embodiments, the first fastener includes a tab and the second fastener includes a hole.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example gas turbine engine.

FIG. 2A illustrates an example airfoil in the gas turbine engine.

FIG. 2B illustrates a sectioned view of the airfoil of FIG. 1A.

FIG. 9A illustrates a partially cutaway view of another example panel that has a geometrically segmented coating section.

FIG. 9B illustrates a sectioned view of the geometrically segmented coating section.

FIG. 9C illustrates an isolated view of a wall of the geometrically segmented coating section, without the coating.

FIG. 10 illustrates a sectioned view of a fastener joint having a tab and a hole, and a seal member sealing the hole.

DETAILED DESCRIPTION

Figure 3:
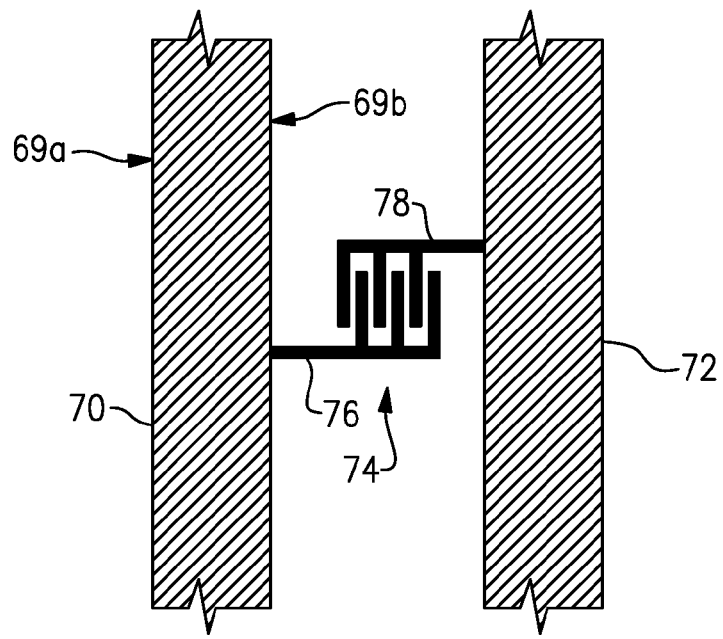
FIG. 3 illustrates an example fastened joint between a panel and a core structure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

FIG. 2A illustrates one such component, namely an airfoil 60. For instance, the airfoil 60 can be a turbine vane, as represented at 60*a* in FIG. 1, or a compressor vane, as represented at 60*b* in FIG. 1. As will be appreciated, although the examples herein are described in the context of a vane, this disclosure is not limited to vanes, and the examples may also be applicable to blades or other airfoils that are exposed to high temperatures.

The airfoil 60 includes inner and outer platforms 62/64 and an airfoil section 66 that extends radially between the inner and outer platforms 62/64. The airfoil section 66 may be hollow and can include one or more internal passages 68 (FIG. 2B). A passage can include a cavity, a channel, or the like.

The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

Referring also to FIG. 2B, the airfoil 60 includes at least one distinct panel 70. In this example, the airfoil 60 includes multiple panels 70, but can alternatively include additional panels 70, fewer panels 70, or a single panel 70. Each such panel 70 has an exterior, gas path side 69*a* that is exposed in the core gas path and an opposed interior side 69*b*. Some of the panels 70 are in the airfoil section and form a portion of the airfoil profile AP. Other of the panels 70 are in the inner and outer platforms 62/64 and form endwall surfaces of the core gas path (i.e., radially inner or outer surfaces of the core gas path). In the depicted example, the panels 70 in the airfoil section collectively form the leading end (LE) and at least portions of the pressure side (PS) and suction side (SS).

The example herein may be described with regard to a panel 70 in the airfoil section 66; however, it is to be understood that the examples also apply to a panel in the inner or outer platforms 62/64. One or more of the panels 70 are fastened to a core structure 72, which mechanically supports the fastened panel or panels 70. As an example, one or more of the panels 70 are each fastened to the core structure 72 at a respective fastener joint 74, which is also shown in FIG. 3. It is to be understood that multiple fastener joints 74 may be used to secure each panel 70 to the core structure 72.

As shown in FIG. 3, the panel 70 includes a first fastener 76 on the interior side 69*b* and the core structure 72 includes a second fastener 78 that is locked with the first fastener 76. In this regard, the fasteners 76/78 may be hardware pieces that have a primary function of locking together. Although not limited, the fasteners 76/78 may be hardware pieces that require an external mechanical actuation to effectuate locking, such as a deformation and/or a relative change between orientations of the fasteners 76/78.

The fasteners 76/78 may be permanently locked together such that the panel 70 and core structure 72 cannot be separated without destroying the panel 70, the core structure 72, or the fasteners 76/78 for their intended purposes. Most typically though, the fasteners 76/78 non-permanently lock such that the panel 70 is removably fastened to the core structure 72. The panel 70 can thus be removed and repaired or replaced if needed.

Figure 4:
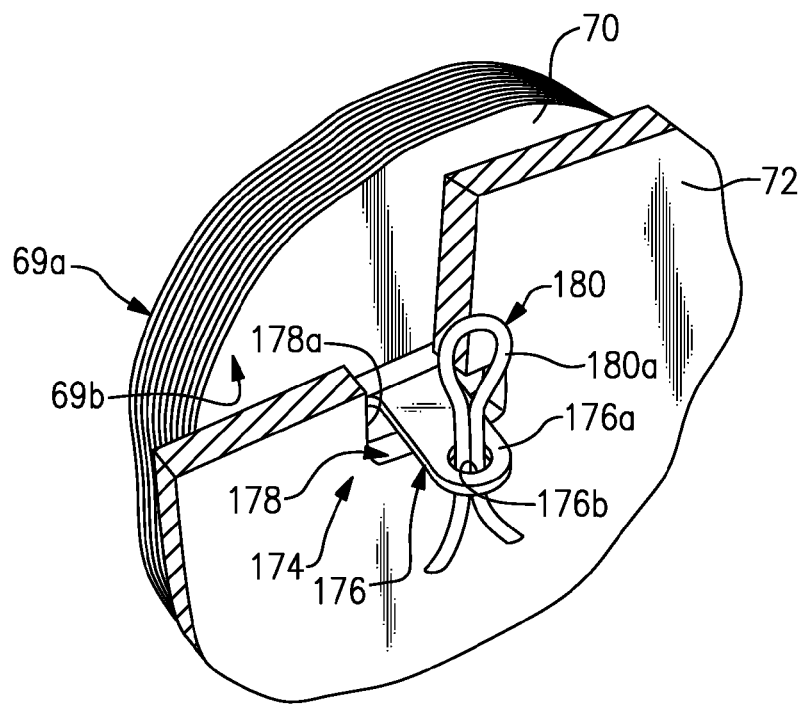
FIG. 4 illustrates a partially cutaway view of an example panel fastened to a core structure with a cotter pin.

FIG. 4 illustrates a cutaway view of another example of a fastener joint 174. In this disclosure, like reference numerals designate like elements where appropriate and reference numerals with the addition of one-hundred or multiples thereof designate modified elements that are understood to incorporate the same features and benefits of the corresponding elements. The panel 70 includes a first fastener 176 and the core structure 72 includes a second fastener 178 that is locked with the first fastener 176. In this example, the first fastener 176 includes a tab 176*a*, and the second fastener 178 includes a hole 178*a*. The tab 176*a* extends through the hole 178*a*. A retainer 180 locks the tab 176*a* with the hole 178*a*. In this example, the tab 176*a* includes an orifice 176*b* near its free end. The retainer 180, which in this example includes a cotter pin 180*a*, engages the orifice 176*b*. For instance, the tip ends of the cotter pin 180*a* are deformed after insertion of the cotter pin 180*a* through the orifice 176*b*. The cotter pin 180*a* thus locks in the orifice 176*b*, thereby locking the tab 176*a* by preventing the tab 176*a* from being removed through the hole 178*a*. Although locked together, the fastening is non-rigid and permits limited relative movement between the panel 70 and the core structure 72, to accommodate thermal expansion/contraction.

Figures 5, 6:
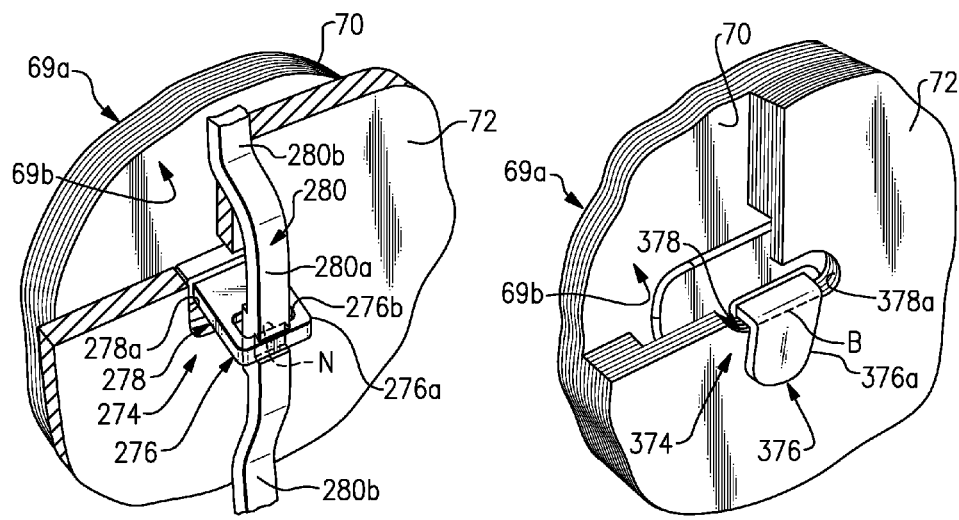
FIG. 5 illustrates a partially cutaway view of an example panel fastened to a core structure with a spring.
FIG. 6 illustrates a partially cutaway view of an example panel fastened to a core structure with a deformed tab.

FIG. 5 illustrates a cutaway view of another example of a fastener joint 274. In this example, the panel 70 includes a first fastener 276 and the core structure 72 includes a second fastener 278 that is locked with the first fastener 276. The first fastener 276 includes a tab 276*a*, and the second fastener 278 includes a hole 278*a*. The tab 276*a* extends through the hole 278*a*. A retainer 280 locks the tab 276*a* with the hole 278*a*. The tab 276*a* includes an orifice 276*b* near its free end. The retainer 180, which in this example includes a spring 280*a*, engages the orifice 276*b* and thus prevents removal of the tab 276*a* from the hole 278*a*. For instance, the spring 280*a* is a leaf or wire spring with arms 280*b* that abut the surface of the core structure 72 to provide a biasing force on the tab 280*a*. The arms 280*b* may be bonded, such as by welding, to the core structure 72 to ensure that the spring 280*a* remains in proper position and/or to reduce the potential for the spring 280*a* to jostle loose and damage other components. The spring 280*a* may tightly fasten the panel 70 and the core structure 72 together; however, the spring 280*a* also permits limited relative movement between the panel 70 and the core structure 72, to accommodate thermal expansion/contraction.

The size of the spring 280*a* can be adapted to provide a desired magnitude of biasing force. The biasing force biases the panel 70 against the core structure 72, thereby positively positioning the panel 70 relative to the core structure 72. The retainer 280 may also include a notch that serves as a seat for engaging the orifice 276b of the tab 276a. For example, a notch N is shown in phantom on the spring 280a.

FIG. 6 illustrates a cutaway view of another example of a fastener joint 374. In this example, the panel 70 includes a first fastener 376 and the core structure 72 includes a second fastener 378 that is locked with the first fastener 376. The first fastener 376 includes a tab 376a, and the second fastener 378 includes a hole 378a. The tab 376a extends through the hole 378a. Rather than a retainer, the tab 376a in this example is deformed at bend B to lock the tab 376a with the hole 378a. The tab 376a may be bent to conform over the core structure 72 and tightly fasten the panel 70 and the core structure 72 together; however, the tab 376a also permits limited relative movement between the panel 70 and the core structure 72, to accommodate thermal expansion/contraction. Alternatively, tab 376a may be bent loosely over the core structure 72 to permit play between the panel 70 and core structure 72 and thus accommodate a greater amount of thermal expansion/contraction.

The examples herein also represent a method of fastening the panel 70 to the core structure 72. For instance, the method may include using a retainer to lock a tab with a hole or deforming a tab to lock a tab with a hole. In the examples above, the method may include using the retainer 180/280 to lock the tab 176a/276a with the hole 178a/278a or ii) deforming the tab 376a to lock the tab 376a with the hole 378a.

Figures 7, 8:
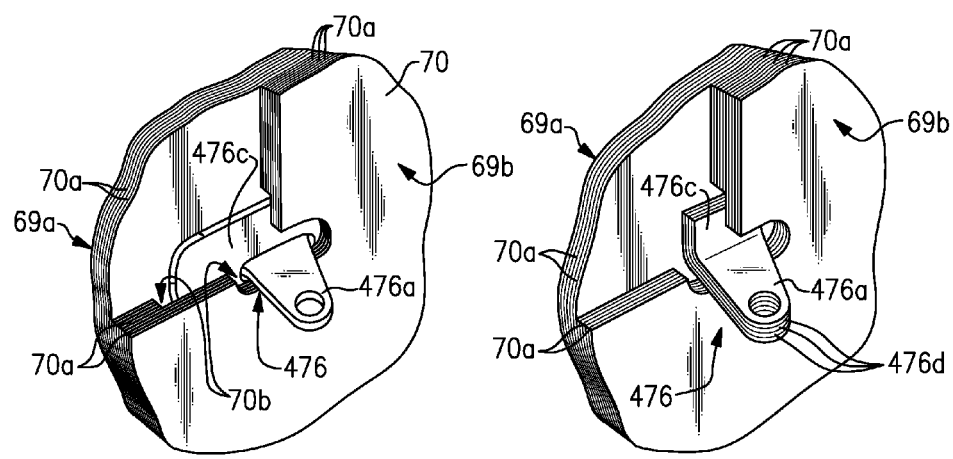
FIG. 7 illustrates a partially cutaway view of an example panel that has a metal fastener integrated into the body of the panel.
FIG. 8 illustrates a partially cutaway view of an example panel that has a composite fastener integrated into the body of the panel.

The first fasteners may be secured with or integrated into the body of the panel 70. FIG. 7 illustrates a cutaway portion of the panel 70. In this example, the body of the panel 70 is formed of a laminated ceramic matrix composite having layers 70a, and the first fastener 476 includes tab 476a that projects from a base 476c. The base 476c is disposed between the layers 70a, thereby securing the first fastener 476 with the body of the panel 70. The tab 476a extends through a portion of the layers 70a such that the orifice 476b is exposed for fastening.

If the first fastener 476 is formed of metal, the thermal expansion and contraction behavior of the body of the panel 70 and the first fastener 476 may differ. To accommodate thermal expansion and contraction behavior differences, the base 476c may be disposed in a cavity 70b between the layers 70a. For instance, the base 476c may be free-floating in the cavity 70b. Thus, if the first fastener 476 thermally expands or contracts more than the body of the panel 70, the gaps between the base 476c and the sides of the cavity 70b can accommodate the difference and thus reduce or avoid thermal stresses.

The cavity 70b may be formed, at least in part, by cutting out sections of the layers 70a during fabrication of the body of the panel 70. Additionally or alternatively, the cavity 70b may be formed, at least in part, by encasing the base 476c in a sacrificial material. The sacrificial material temporarily enlarges the base 476c during fabrication of the body of the panel 70, thereby establishing the cavity 70b. However, the sacrificial material is lost during fabrication, such as during sintering or pyrolysis. As an example, the sacrificial material may be carbon, which thermally degrades and vaporizes in air at elevated sintering or pyrolysis temperatures. Once lost, the base 476c remains and is smaller than the resulting cavity 70b.

In a modified example shown in FIG. 8, the first fastener 476 is formed of a ceramic matrix composite rather than metal. The ceramic matrix composite of the first fastener 476 includes layers 476d. The layers 476d form the tab 476a and the base 476c. The layers 476d may split or flare outwards to form the base 476c, for example. The layers 476d in the base 476c are interposed with the layers 70a of the body of the panel 70. If the same or similar composition of ceramic matrix composite is used for the body of the panel 70 and the first fastener 476, the cavity 70b may be smaller or completely eliminated such that the base 476c is rigidly affixed in the body of the panel 70.

There may be different environmental conditions at different locations around the airfoil profile AP or at the inner and outer platforms 62/64. In this regard, the panels 70 and core structure 72 may be formed of different materials. For example, one or more of the panels 70 is ceramic, which has high temperature resistance and corrosion resistance in comparison to nickel alloys. A ceramic is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. In further examples, one or more of the panels 70 are formed of a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

The core structure 72 may be formed of a ceramic or of a metal alloy. Metal alloys provide a good combination of strength and durability. Example alloys may include, but are not limited to, nickel alloys, cobalt alloys, a nickel alloy coated with cobalt or cobalt alloy, or a non-nickel alloys that do not substantially react with ceramic. Additionally, if the core structure 72 is metal, the core structure 72 may not be exposed in the core gas path or may be exposed only at locations on the airfoil profile AP that are relatively less severe. For instance, if in the airfoil section 66, the aft portion of the core structure 72 may include exterior wall portions 72a (FIG. 2B) that form a portion of the airfoil profile AP. In that example, the exterior wall portions 72a form the trailing end TE of the airfoil profile AP, which may have less severe environmental exposure conditions which the alloy of the core structure 72 can withstand.

If enhanced thermal or environmental resistance is desired, one or more of the panels 70 and/or the core structure 72 can be coated with a thermal and/or environmental barrier ceramic coating. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

Additionally or alternatively, one or more of the panels 70 and/or the core structure 72 may include a geometric segmented coating section. For instance, FIG. 9A illustrates a portion of a panel 170 that includes a geometric segmented coating section 190, but it is to be understood that the coating section 190 is also applicable to the core structure 72. A representative sectioned view of the coating section 190 is shown in FIG. 9B. The coating section 190 includes a metal wall 192. The metal wall 192 includes a first or inner side 192a and a second or exterior side 192b that is opposite the first side 192a. The exterior side 192b is also the exterior side 69a exposed in the core gas path. The second side 192b includes an array of cells 194 defined by cell sidewalls 194a. The array is a repeating geometric pattern of one or more cell geometries. In this example, the cell sidewalls 194*a* have a uniform thickness. As shown in the isolated view of the wall 192 in FIG. 9C, the cells 194 are hexagonal. Alternatively, the cells 194 may be circular, ovular, other polygonal geometry, or mixed cell geometries.

A coating 196 (FIG. 9B) is disposed in the array of cells 194. The cells 194 mechanically facilitate bonding of the coating 196 on the wall 192. The cells 194 thus provide good bonding and spallation resistance of the coating 196, particularly at higher temperature locations. In turn, greater spallation resistance may reduce the need for bleed air for cooling or enable use of higher temperature bleed air that is less of an efficiency penalty. The coating 196 may be a barrier coating, such as a thermal barrier or environmental barrier, which is formed of a ceramic material. The coating 196 may be a monolayer coating but more typically will be a multi-layer coating. For instance, the coating 196 has a first coating layer 196*a* and a second coating layer 196*b*. In this example, the second coating layer 196*b* is a topcoat.

The ceramic material of the coating 196 provides thermal and/or environmental resistance. As an example, the ceramic material may include or may be yttria stabilized with zirconia, hafnia, and/or gadolinia, gadolinia zirconate, molybdate, alumina, or combinations thereof. Additionally or alternatively, the ceramic material may include or may be a ceramic matrix composite which has a reinforcement phase, such as ceramic or carbon fibers, dispersed in a ceramic matrix formed of oxides, carbides, nitrides, borides, silicides, or combinations thereof.

The coating 196 may also include a bond coat for attaching the ceramic material to the wall 192 and cells 194. The wall 192 and cells 194 may be formed of an alloy. Example alloys may include, but are not limited to, nickel alloys, cobalt alloys, a nickel alloy coated with cobalt or cobalt alloy, or a non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 194*a* also facilitate reducing internal stresses in the coating 196 that may occur from sintering at relatively high surface temperatures during use in the engine 20. The sintering may result in partial melting, densification, and diffusional shrinkage of the coating 196 and thereby induce internal stresses. The cell sidewalls 194*a* serve to produce faults in at least the portion of the coating 196 above the cell sidewalls 194*a*. The faults provide locations for releasing energy associated with the internal stresses (e.g., reducing shear and radial stresses). That is, the energy associated with the internal stresses may be dissipated in the faults such that there is less energy available for causing delamination cracking between the coating 196 and the underlying wall 192.

The coating section 190 may be formed using several different fabrication techniques. As an example, the wall 192 may be fabricated by investment casting, additive manufacturing, brazing, or combinations thereof, but is not limited to such techniques. For instance, the cells 194 can be separately fabricated and brazed to the remaining portion of the wall 192, which can be investment cast or additively fabricated. Alternatively, the cells 194 can be formed by other techniques, such as depositing an alloy coating and removing sections of the alloy coating by machining, electro-discharge machining (EDM), or other removal process.

To produce the coating 196, ceramic coating material is deposited in the cells 194. The deposition process can include, but is not limited to, plasma spray or physical vapor deposition. In one example, plasma spray is used to produce a more durable version of the coating 196. For instance, the coating 196 has a laminar microstructure. The laminar microstructure includes grains of ceramic material that have a high aspect ratio. The laminar microstructure is a product of the plasma spray process, in which droplets of melted or partially melted ceramic material are sprayed onto the cells 194. Upon impact, the droplets flatten and solidify, yielding the laminar microstructure. There may be voids or pores among the grains; however, the coating 196 is substantially fully dense. For instance, the coating 196 has a porosity of less than 15%.

The ceramic coating material fills or substantially fills the cells 194 and is deposited in a thickness that is greater than the height of the cell sidewalls 194*a*. At this stage, the surface of the coating may have contours from the underlying cells 194. If such contours are undesired, the surface may be machined, ground, or abraded flat. For instance, the surface is reduced down to or close to the tops of the cell sidewalls 194*a*.

In this example, the first fastener 576 includes a tab 576*a* that projects from the metal wall 192 of the panel 170. For instance, the tab 576*a* may be integrally formed with the wall 192 or separately formed and bonded to the wall 192. The wall 192 may be fabricated by investment casting, additive manufacturing, brazing, or combinations thereof, but is not limited to such techniques. If integrally formed, the tab 576*a* may be formed during fabrication of the wall 192 such that the wall 192 and tab 576*a* form a monolithic piece.

The panel 170 (or panel 70) may also include features that facilitate cooling in the airfoil 60. For instance, the panel 170 (or panel 70) includes a seal member 198 that seals the hole 178*a* (or 287*a* or 378*a*), as shown in FIG. 10. In this example, the seal member 198 is a ridge that circumscribes the hole 178*a* and thus prevents or limits cooling bleed air flow F from escaping through the hole 178*a* to the panel 170. The seal member 198 may also serve as a stand-off to space the panel 170 from the core structure 72, thereby establishing a passage 199 between the panel 170 and the core structure 72. If sealing is not desired, rather than a continuous ring around the hole 178*a*, the ridge may be intermittent or may instead be discrete spaced-apart pillars or protrusions that serve as stand-offs.

The seal member 198 may be a separate, distinct piece from the panel 170 and core structure 72. For instance, the seal member 198 may be clamped between the panel 170 and the core structure 72, or bonded to the panel 170 or core structure 72. In another alternative, the seal member 198 may be integral with the body of the panel 170. For instance, in the example of FIG. 9*a* the seal member 198 is integral with the metal wall 192.

The core structure 72 may include one or more cooling holes 72*b*, for controlled conveyance of cooling bleed air flow F into the passage 199 to cool the panel 170. In this regard, the panel 170 may also have cooling holes for discharging a film of cooling bleed air along the exterior side of the panel 170. Additionally or alternatively, slots or holes may be provided between adjacent panels 170. One or more dedicated stand-offs 200 may also be configured to space the panel 170 (or 70) from the core structure 72. For instance, the stand-off 200 is a pillar that projects from the body of the panel 170. Like the seal member 198, the stand-off 200 may be a separate, distinct piece from the panel 170 and core structure 72, bonded to the panel 170 or core structure 72, or integral with the body of the panel 170.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
a core structure including a first fastener comprising a hole; and
a panel fastened to the core structure, the panel having an exterior, gas path side and an opposed interior side, the interior side including a second fastener comprising a tab locked with the hole such that the core structure supports the panel, the tab including a retainer locking the tab with the hole, and the retainer is a cotter pin.

2. The airfoil as recited in claim 1, wherein the panel includes a metal wall, and the tab projects from the metal wall.

3. The airfoil as recited in claim 1, wherein the panel includes a geometrically segmented coating section, the geometrically segmented coating section including a wall that has the exterior side, the exterior side including an array of cells, and a coating disposed in the array of cells.

4. The airfoil as recited in claim 1, wherein the panel is ceramic and the core structure is metal.

5. The airfoil as recited in claim 1, wherein the panel is in an airfoil section that defines an airfoil profile, and the panel forms a portion of the airfoil profile.

6. An airfoil comprising:
a core structure including a first fastener comprising a hole; and
a panel fastened to the core structure, the panel having an exterior, gas path side and an opposed interior side, the interior side including a second fastener comprising a tab locked with the hole such that the core structure supports the panel, the tab including a retainer locking the tab with the hole, and the retainer including a spring biasing the panel against the core structure.

7. An airfoil comprising:
a core structure including a first fastener comprising a hole; and
a panel fastened to the core structure, the panel having an exterior, gas path side and an opposed interior side, the interior side including a second fastener comprising a tab locked with the hole such that the core structure supports the panel, the panel being formed of a laminated ceramic matrix composite having layers, the second fastener including a base from which the tab projects, and the base is disposed between the layers, the layers defining a cavity, and the base is free-floating in the cavity.

8. The airfoil as recited in claim 7, wherein the base and the tab are formed from at least one of a metal or a ceramic.

9. An airfoil comprising:
a core structure including a first fastener comprising a hole;
a panel fastened to the core structure, the panel having an exterior, gas path side and an opposed interior side, the interior side including a second fastener comprising a tab locked with the hole such that the core structure supports the panel; and
as recited in claim a seal member sealing the hole.

10. A gas turbine engine comprising:
a compressor section;
a combustor in fluid communication with the compressor section; and
a turbine section in fluid communication with the combustor,
at least one of the turbine section or the compressor section including an airfoil having an airfoil section defining an airfoil profile, the airfoil section including
a core structure including a first fastener comprising a hole, and
a panel fastened to the core structure, the panel having an exterior, gas path side and an opposed interior side, the interior side including a second fastener comprising a tab locked with the hole such that the core structure supports the panel, the tab including a retainer locking the tab with the hole, and the retainer including a spring biasing the panel against the core structure.

11. The gas turbine engine as recited in claim 10, wherein the panel is ceramic and the core structure is metal.

* * * * *